United States Patent
Hendrickson et al.

(10) Patent No.: US 11,443,044 B2
(45) Date of Patent: Sep. 13, 2022

(54) TARGETED VERY LONG DELAY FOR INCREASING SPECULATIVE EXECUTION PROGRESSION

(71) Applicant: International Business Machines Corporation, Armonk, NY (US)

(72) Inventors: Olaf Knute Hendrickson, Rochester, MN (US); Michael P Mullen, Poughkeepsie, NY (US); Matthew Michael Garcia Pardini, Middlesex, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 483 days.

(21) Appl. No.: 16/578,741

(22) Filed: Sep. 23, 2019

(65) Prior Publication Data
US 2021/0089660 A1  Mar. 25, 2021

(51) Int. Cl.
*G06F 21/57* (2013.01)
*G06F 21/79* (2013.01)
*G06F 9/38* (2018.01)
*G06F 9/30* (2018.01)

(52) U.S. Cl.
CPC ........ *G06F 21/577* (2013.01); *G06F 9/30043* (2013.01); *G06F 9/3842* (2013.01); *G06F 21/79* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 8,683,583 B2 | 3/2014 | Miller et al. | |
| 9,189,617 B2 | 11/2015 | Sherman | |
| 9,262,170 B2 | 2/2016 | Krishna et al. | |
| 9,665,674 B2 | 5/2017 | Cho et al. | |
| 9,891,926 B2 | 2/2018 | Emma | |
| 9,934,341 B2 | 4/2018 | Berry et al. | |
| 11,169,805 B2 * | 11/2021 | Calhoun | G06F 12/0848 |

(Continued)

OTHER PUBLICATIONS

Chen et al.; "SGXPECTRE Attacks: Stealing Intel Secrets from SGX Enclaves via Speculative Execution"; The Ohio State University; arXiv:1802.09085v3 [cs.CR]; Jun. 3, 2018; 16 pages.

(Continued)

*Primary Examiner* — Michael Pyzocha
(74) *Attorney, Agent, or Firm* — Cantor Colburn LLP; Jeffrey Ingalls

(57) ABSTRACT

A computer-implemented method for advancing speculative execution in microarchitectures is disclosed. A non-limiting example of the computer-implemented method includes receiving, by a processor, a test scenario including a first load instruction from a first memory location flagged with a delay notification and a speculative memory access instruction from a second memory following the first load instruction. The method executes, by the processor, the first load instruction from the first memory location and delays a return of data from the first memory location for a number of processor cycles. The method executes, by the processor, the speculative storage access instruction from the second memory location during the delay in returning the data from the first memory location.

20 Claims, 2 Drawing Sheets

(56) References Cited

U.S. PATENT DOCUMENTS

| | | | |
|---|---|---|---|
| 2002/0184613 A1 | 12/2002 | Kuzemchak et al. | |
| 2004/0111594 A1 | 6/2004 | Feiste et al. | |
| 2007/0050601 A1* | 3/2007 | Chaudhry | G06F 9/3885 |
| | | | 712/E9.05 |
| 2009/0204384 A1 | 8/2009 | Akiba et al. | |
| 2010/0250497 A1 | 9/2010 | Redlich et al. | |
| 2011/0191854 A1 | 8/2011 | Giakouminakis et al. | |
| 2013/0013283 A1 | 1/2013 | Gam | |
| 2014/0201843 A1 | 7/2014 | Hibbert et al. | |
| 2014/0310814 A1 | 10/2014 | Hay et al. | |
| 2014/0317361 A1* | 10/2014 | Dally | G06F 13/161 |
| | | | 711/154 |
| 2016/0232084 A1 | 8/2016 | Bhat et al. | |
| 2017/0019422 A1 | 1/2017 | Makowski et al. | |
| 2017/0351318 A1 | 12/2017 | Gu et al. | |
| 2018/0241548 A1 | 8/2018 | Dolev et al. | |
| 2019/0065405 A1* | 2/2019 | Gotze | G06F 12/1408 |
| 2019/0205140 A1* | 7/2019 | Grisenthwaite | G06F 12/1491 |
| 2019/0311129 A1* | 10/2019 | Clifton | G06F 21/57 |
| 2019/0332379 A1* | 10/2019 | Calhoun | G06F 12/126 |
| 2019/0370001 A1* | 12/2019 | Teyssier | G06F 9/3806 |
| 2020/0065112 A1* | 2/2020 | Gotze | G06F 9/3844 |
| 2020/0210197 A1* | 7/2020 | Asanovic | G06F 21/556 |
| 2020/0301712 A1* | 9/2020 | Sakalis | G06F 9/30054 |
| 2020/0410088 A1* | 12/2020 | Greenhalgh | G06F 12/1441 |
| 2021/0056043 A1* | 2/2021 | Grisenthwaite | G06F 12/0871 |
| 2021/0064550 A1* | 3/2021 | Hendrickson | G06F 12/0862 |
| 2021/0064787 A1* | 3/2021 | Saileshwar | G06F 21/54 |
| 2021/0081530 A1* | 3/2021 | O'Farrell | G06F 12/1441 |
| 2021/0240619 A1* | 8/2021 | Earnshaw | G06F 12/145 |
| 2021/0264027 A1 | 8/2021 | Venkataramani | |

OTHER PUBLICATIONS

Kocher et al.; "Spectre Attacks: Exploiting Speculative Execution"; Cornell University, arXiv:1801.01203; Jan. 3, 2018; 16 pages.

Lipp et al.; "Meltdown"; Cornell University, arXiv:1801.01207; Jan. 3, 2018; 16 pages.

List of IBM Patents or Patent Applications Treated as Related; Date Filed: Sep. 24, 2019, 2 pages.

Pardini et al., "Identifying Microarchitectural Security Vulnerabilities Using Simulation Comparison With Modified Secret Data"; U.S. Appl. No. 16/578,739, filed Sep. 23, 2019.

Walcott et al.; "Dynamic Prediction of Architectural Vulnerability from Microarchitectural State"; ISCA'07 34th ACM Annual Inter. Symp. On; Jun. 9-13, 2007; 12 pages.

Wu et al.; "Eliminating Timing Side-Channel Leaks using Program Repair"; ISSTA'18 27th ACM SIGSOFT International Symposium On; arXiv: 1806.02444v2 [cs.CR]; Jul. 21, 2018; 12 pages.

Zhang et al.; "Identifying Security Critical Properties for the Dynamic Verification of a Processor"; ASPLOS'17 22nd ACM Inter. Conf. On; Apr. 8-12, 2017; 14 pages.

Transmittal Form PTO/SB/21, signed Mar. 17, 2020.

* cited by examiner

TARGETED VERY LONG DELAY FOR INCREASING SPECULATIVE EXECUTION PROGRESSION

BACKGROUND

The present invention generally relates to security verification of processors, and more specifically, to targeted very long delay for increasing speculative execution progression.

Many modern microprocessors have critical vulnerabilities that allow malicious programs to steal data being processed on computers having these microprocessors. Programs are typically not allowed to read data from other programs, but malicious programs can exploit microprocessor vulnerabilities to take secrets stored in the memory of other running programs. This secret data may include, for example, passwords, personal photos, emails, messages, or business-critical documents. Thus, it is important during the design of modern microprocessors to create designs that do not have these vulnerabilities.

SUMMARY

Embodiments of the present invention are directed to a computer-implemented method for advancing speculative execution in microarchitectures. A non-limiting example of the computer-implemented method includes receiving, by a processor, a test scenario including a first load instruction from a first memory location flagged with a delay notification and a speculative memory access instruction from a second memory location following the first load instruction. The method executes, by the processor, the first load instruction from the first memory location and delays a return of data from the first memory location for a number of processor cycles. The method executes, by the processor, the speculative storage access instruction from the second memory location during the delay in returning the data from the first memory location.

Embodiments of the present invention are directed to a system for advancing speculative execution in microarchitectures. A non-limiting example of the system includes a processor and memory coupled to the processor. The memory has stored therein instructions that when executed cause the processor to receive a test scenario including a first load instruction from a first memory location flagged with a delay notification and a speculative memory access instruction from a second memory location following the first load instruction. The instructions cause the processor to execute the first load instruction from the first memory location and delaying a return of data from the first memory location for a number of processor cycles and execute the speculative storage access instruction from the second memory location during the delay in returning the data from the first memory location.

Embodiments of the invention are directed to a computer program product for advancing speculative execution in microarchitectures, the computer program product comprising a computer readable storage medium having program instructions embodied therewith. The program instructions are executable by a processor to cause the processor to perform a method. A non-limiting example of the method includes receiving, by a processor, a test scenario including a first load instruction from a first memory location flagged with a delay notification and a speculative memory access instruction from a second memory location following the first load instruction. The method executes, by the processor, the first load instruction from the first memory location and delays a return of data from the first memory location for a number of processor cycles. The method executes, by the processor, the speculative storage access instruction from the second memory location during the delay in returning the data from the first memory location.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
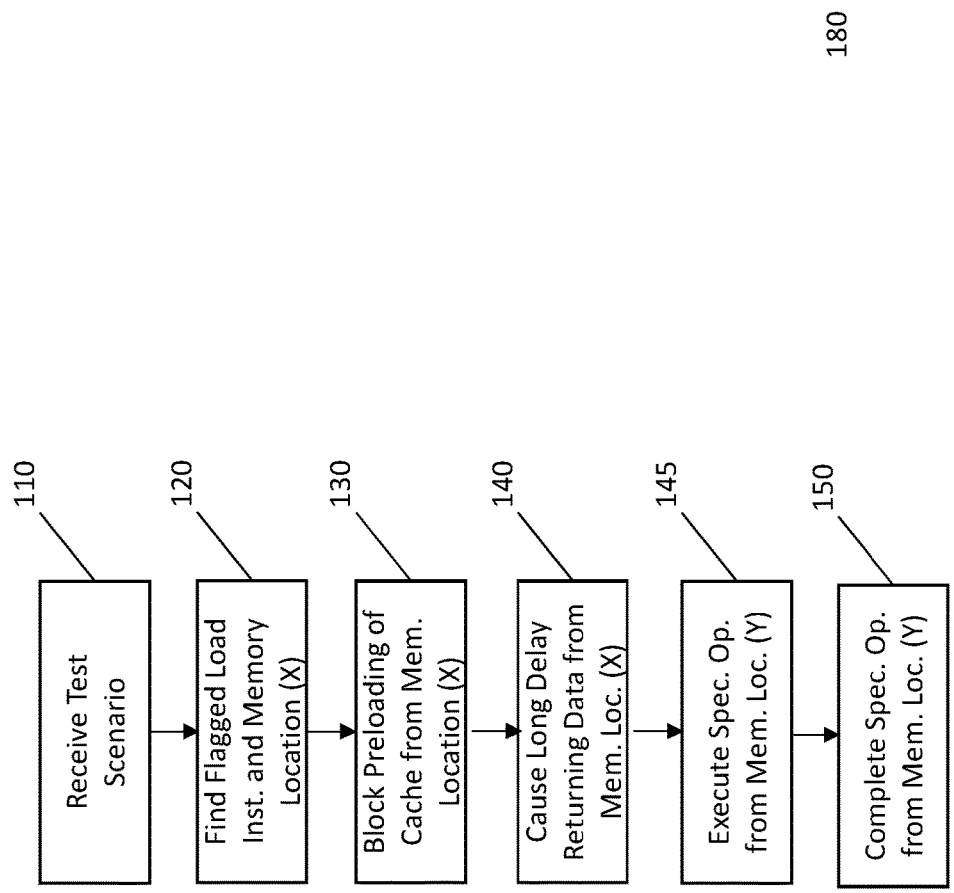
FIG. 1 depicts a flowchart of a first computer-implemented vulnerability testing method according to embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, modern microprocessors can have critical vulnerabilities that allow malicious programs to steal data being processed on computers having these microprocessors. Programs are typically not allowed to read data from other programs, but malicious programs, such as Meltdown and Spectre, can exploit microprocessor vulnerabilities to take secrets stored in the memory of other running programs.

Meltdown and Spectre introduced the world to the idea of leveraging speculative execution to extract secrets from processors. Identifying these exploits took months for a multinational team of security researchers. Meltdown breaks down the isolation between user applications and an operating system. The attack permits a program to access memory of other programs and the operating system. Meltdown works by side effects caused by out-of-order execution. Out-of-order execution is used in processors to overcome latencies of execution units. Instead of waiting for data to arrive from memory and slowing down execution of the processor, modern processors will look ahead and execute operations out-of-order. This speculative execution presents a security vulnerability. Meltdown takes advantage of this out-of order execution to read privileged information in an out-of-order stream and send the date to the outside world. Spectre breaks down the isolation between different user applications. It allows an attacker to trick programs into leaking secrets.

Computer platform designers need to ensure that these and similar exploits do not exist in their systems. In particular, designers need to verify that speculative execution will not present the opportunity for a Meltdown exploit. Speculative execution verification requires delaying completion of instructions and allowing pipelines to fill up with instructions that are speculatively issued. It is difficult to build up a sequence of instructions with delays to back up the completion of an instruction using natural processes such as cache miss.

Turning now to an overview of the aspects of the invention, one or more embodiments of the invention address the above-described shortcomings of the prior art by creating a first load that is used in a sequence of instructions that could potentially lead to a Meltdown or Spectre security scenario. The address of this first load is marked in a test scenario and is made available to a simulation environment upon which the test scenario is executed. The simulation environment will note the address of this marked, first load and add a very long delay in returning data for that first load to the processor core. While waiting for this first load to return data, a speculative storage access from a second memory location is executed that may generate an access exception. During the time period following the second instruction and prior to returning data from the first load, the simulation environment continues to speculatively execute the test scenario.

The above-described aspects of the invention address the shortcomings of the prior art by not requiring a complex and time consuming build-up of a sequence of instructions with delays to back up completion of the load using natural hardware processes.

Turning now to a more detailed description of aspects of the present invention, FIG. 1 depicts a flowchart of a first computer-implemented vulnerability testing method according to embodiments of the invention. The method receives in a simulation environment a test scenario containing a first load instruction from a memory location (X). (Stage 110). The simulation environment simulates a microarchitecture and operates on a computer platform as described, for example, in FIG. 2. The first load instruction in the test scenario is flagged with a notation to the simulation environment that the returning of data in response to this load instruction should be delayed. In addition, the test scenario should be constructed such that address (X) is not used in other operations; however, the data at address (X) may be used in speculatively issued operations.

The test scenario has a speculative storage access instruction from a memory location (Y) that may be dependent on the data accessed at address (X), where memory location (X) is not the same as memory location (Y), that follows the first load instruction. The speculative storage access instruction can be a load, store, or load-store operation. The speculative storage access instruction, in certain embodiments, may immediately follow the first load instruction.

There may be any number of data dependencies in a chain from the access of memory location (X) to the speculative storage access instruction of memory location (Y). The speculative storage access instruction from memory location (Y) may be such that it will generate an exception, but any access of memory location (Y) that is speculative will suffice. For example, a branch that is dependent on a long delay in accessing memory location (X) will also work. Alternatively the speculative storage access instruction from memory location (Y) can be in a path not executed by virtue of being in a branch path that is not taken. In this embodiment, a branch decision is dependent on memory location (X) access, branch prediction is wrong, and causes the processor to speculatively begin execution of the speculative storage access instruction from memory location (Y). When the branch decision is made, the hardware throws away the partially executed second load.

After receiving the test scenario, the simulation environment scans the test scenario and finds the first load instruction from memory location (X) that has the delay flag. (Stage 120). The simulation environment also refrains from pre-loading of cache from memory location (X). (Stage 130). The simulation environment executes that test scenario and upon execution of the first load instruction causes a long delay in returning data from memory location (X). (Stage 140). A long delay is a delay longer than that which is necessary for the processor design to fill it's capacity for speculative execution, and may be about 1000 cycles and may be up to about 5,000 cycles. The method initiates speculative execution based on the speculative storage access instruction from memory location (Y) while waiting for the long delayed load to complete. (Stage 145). The speculative storage access instruction from memory location (Y) follows that may complete in the sense that it ends in an exception, or is thrown away as an unnecessary speculative operation. (Stage 150).

The speculative storage access instruction is either an exception with an implicit branch to an exception handler or behind a branch that is incorrectly guessed, and in either case is dependent on the long delay. The implicit or explicit branch, when not predicted by branch prediction logic, causes the speculative storage access instruction to be purely speculative and thus any partial results so far thrown away. Since the decision of the implicit or explicit branch is delayed for a long time, the processor has more time to begin speculative execution of more instructions. When this is done in a verification process directed toward security exposures, this allows a higher probability of finding a security leak.

Figure 2:
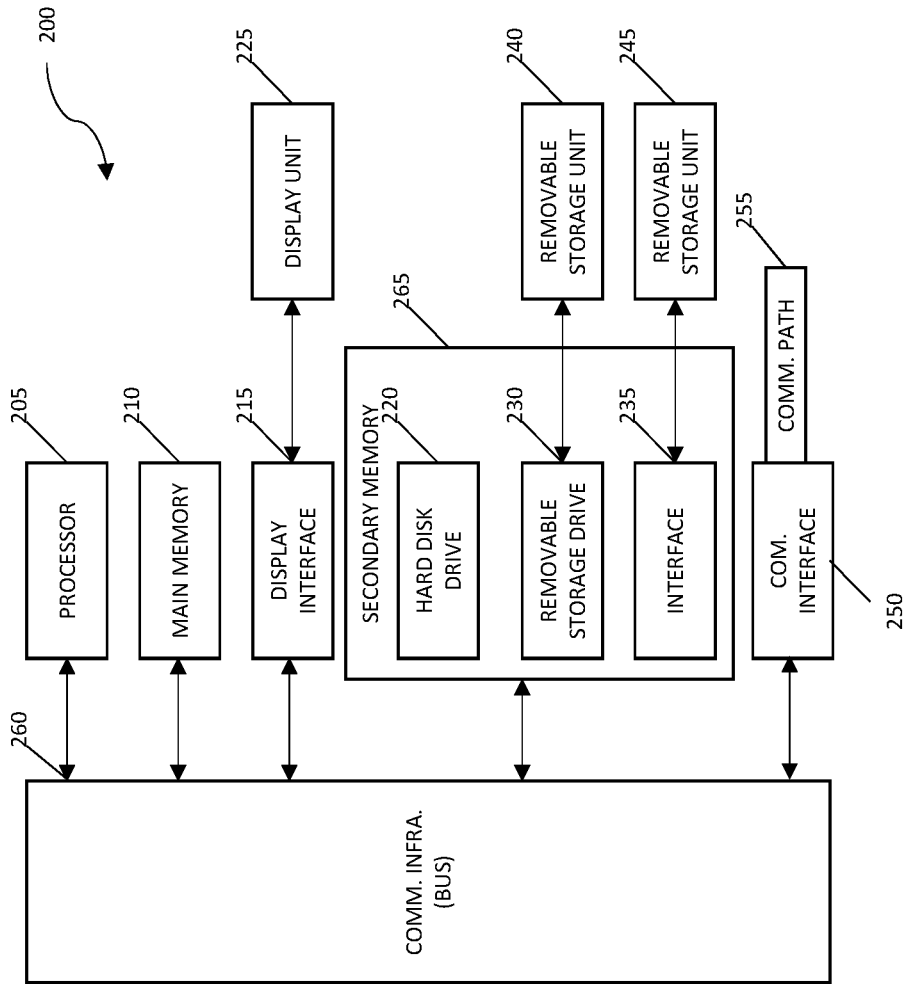
FIG. 2 depicts a high-level block diagram computer system, which can be used to implement one or more aspects of the present invention.

FIG. 2 depicts a high-level block diagram computer system 200, which can be used to implement one or more aspects of the present invention. More specifically, computer system 200 can be used to implement some hardware components of embodiments of the present invention. Although one exemplary computer system 200 is shown, computer system 200 includes a communication path 255, which connects computer system 200 to additional systems (not depicted) and can include one or more wide area networks (WANs) and/or local area networks (LANs) such as the Internet, intranet(s), and/or wireless communication network(s). Computer system 200 and additional system are in communication via communication path 255, e.g., to communicate data between them.

Computer system 200 includes one or more processors, such as processor 205. Processor 205 is connected to a communication infrastructure 260 (e.g., a communications bus, cross-over bar, or network). Computer system 200 can include a display interface 215 that forwards graphics, text, and other data from communication infrastructure 260 (or from a frame buffer not shown) for display on a display unit 225. Computer system 200 also includes a main memory 210, preferably random access memory (RAM), and can also include a secondary memory 265. Secondary memory 265 can include, for example, a hard disk drive 220 and/or a removable storage drive 230, representing, for example, a floppy disk drive, a magnetic tape drive, or an optical disk drive. Removable storage drive 230 reads from and/or writes to a removable storage unit 240 in a manner well known to those having ordinary skill in the art. Removable storage unit 240 represents, for example, a floppy disk, a compact disc, a magnetic tape, or an optical disk, etc. which is read by and written to by removable storage drive 230. As will be appreciated, removable storage unit 240 includes a computer readable medium having stored therein computer software and/or data.

In alternative embodiments, secondary memory 265 can include other similar means for allowing computer programs or other instructions to be loaded into the computer system. Such means can include, for example, a removable storage unit 245 and an interface 235. Examples of such means can include a program package and package interface (such as that found in video game devices), a removable memory chip (such as an EPROM, or PROM) and associated socket, and other removable storage units 245 and interfaces 235 which allow software and data to be transferred from the removable storage unit 245 to computer system 200.

Computer system 200 can also include a communications interface 250. Communications interface 250 allows software and data to be transferred between the computer system and external devices. Examples of communications interface 250 can include a modem, a network interface (such as an Ethernet card), a communications port, or a PCM-CIA slot and card, etcetera. Software and data transferred via communications interface 250 are in the form of signals which can be, for example, electronic, electromagnetic, optical, or other signals capable of being received by communications interface 250. These signals are provided to communications interface 250 via communication path (i.e., channel) 255. Communication path 255 carries signals and can be implemented using wire or cable, fiber optics, a phone line, a cellular phone link, an RF link, and/or other communications channels.

In the present description, the terms "computer program medium," "computer usable medium," and "computer readable medium" are used to generally refer to media such as main memory 210 and secondary memory 265, removable storage drive 230, and a hard disk installed in hard disk drive 220. Computer programs (also called computer control logic) are stored in main memory 210 and/or secondary memory 265. Computer programs can also be received via communications interface 250. Such computer programs, when run, enable the computer system to perform the features of the present invention as discussed herein. In particular, the computer programs, when run, enable processor 205 to perform the features of the computer system. Accordingly, such computer programs represent controllers of the computer system.

Many of the functional units described in this specification have been labeled as modules. Embodiments of the present invention apply to a wide variety of module implementations. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, comprise the module and achieve the stated purpose for the module.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a processor, a test scenario including a first load instruction from a first memory location flagged with a delay notification and a speculative memory access instruction from a second memory location following the first load instruction, wherein the speculative memory access instruction is dependent, either directly or indirectly, on information returned by the first load instruction from the first memory location;
executing, by the processor, the first load instruction from the first memory location and delaying a return of data from the first memory location for a number of processor cycles; and
during the delay in returning data from the first memory location, speculatively executing additional instructions in the test scenario, the speculatively executing comprising:
executing, by the processor, the speculative memory access instruction from the second memory location.

2. The computer-implemented method of claim 1, further comprising blocking preloading from the first memory location into a cache.

3. The computer-implemented method of claim 1, wherein the speculative memory access instruction generates an exception.

4. The computer-implemented method of claim 1, wherein the speculative memory access instruction is on a branch not taken path where the branch decision is dependent on information from the first load instruction from the first memory location.

5. The computer-implemented method of claim 1, wherein the speculative memory access instruction immediately follows the first load instruction.

6. The computer-implemented method of claim 1, wherein the number of processor cycles is greater than 1000 cycles.

7. The computer-implemented method of claim 1, further comprising detecting a security leak during execution of instructions on a speculative path following the speculative memory access instruction by scanning for an observable change to microarchitected results of the test scenario.

8. A system comprising:
a processor,
memory coupled to the processor, the memory having stored therein instructions that when executed cause the processor to:
receive a test scenario including a first load instruction from a first memory location flagged with a delay notification and a speculative memory access instruction from a second memory location following the first load instruction, wherein the speculative memory access instruction is dependent, either directly or indirectly, on information returned by the first load instruction from the first memory location;
execute the first load instruction from the first memory location and delaying a return of data from the first memory location for a number of processor cycles; and
during the delay in returning data from the first memory location, speculatively execute additional instructions in the test scenario, the speculatively executing comprising:
executing the speculative memory access instruction from the second memory location.

9. The system of claim 8, further comprising instructions that cause the processor to block preloading from the first memory location into a cache.

10. The system of claim 8, wherein the speculative memory access instruction generates an exception.

11. The system of claim 8, wherein the speculative memory access instruction is on a branch not taken path where the branch decision is dependent on information from the first load instruction from the first memory location.

12. The system of claim 8, wherein the speculative memory access instruction immediately follows the first load instruction.

13. The system of claim 8, wherein the number of processor cycles is greater than 1000 cycles.

14. The system of claim 8, wherein the instruction when executed further causes the processor to detect a security leak during execution of instructions on a speculative path following the speculative memory access instruction by scanning for an observable change to microarchitected results of the test scenario.

15. A computer program product for advancing speculative execution in microarchitectures, the computer program product comprising a computer readable storage medium having program instructions embodied therewith, the program instructions executable by a processor to cause the processor to:
receive a test scenario including a first load instruction from a first memory location flagged with a delay notification and a speculative memory access instruction from a second memory location following the first load instruction, wherein the speculative memory access instruction is dependent, either directly or indirectly, on information returned by the first load instruction from the first memory location;
execute the first load instruction from the first memory location and delaying a return of data from the first memory location for a number of processor cycles; and
during the delay in returning data from the first memory location, speculatively execute additional instructions in the test scenario, the speculatively executing comprising:
executing the speculative memory access instruction from the second memory location.

16. The computer program product of claim 15, further comprising instructions that cause the processor to block preloading from the first memory location into a cache.

17. The computer program product of claim 15, wherein the speculative memory access instruction generates an exception.

18. The computer program product of claim 15, wherein the speculative memory access instruction is on a branch not taken path where the branch decision is dependent on information from the first load instruction from the first memory location.

19. The computer program product of claim 15, wherein the speculative memory access instruction immediately follows the first load instruction.

20. The computer program product of claim 15, further comprising detecting a security leak during execution of instructions on a speculative path following the speculative memory access instruction by scanning for an observable change to microarchitected results of the test scenario.

* * * * *